US011765210B2

United States Patent
Gonzalez De Langarica

(10) Patent No.: US 11,765,210 B2
(45) Date of Patent: Sep. 19, 2023

(54) NETWORK NODE, IMS NODE AND METHODS IN A COMMUNICATIONS NETWORK

(71) Applicant: Telefonaktiebolaget LM Ericsson (publ), Stockholm (SE)

(72) Inventor: Ester Gonzalez De Langarica, Vitoria (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 29 days.

(21) Appl. No.: 17/616,025

(22) PCT Filed: Jun. 4, 2019

(86) PCT No.: PCT/SE2019/050513
§ 371 (c)(1),
(2) Date: Dec. 2, 2021

(87) PCT Pub. No.: WO2020/246921
PCT Pub. Date: Dec. 10, 2020

(65) Prior Publication Data
US 2022/0303317 A1     Sep. 22, 2022

(51) Int. Cl.
*G06F 15/16*        (2006.01)
*H04L 65/1094*      (2022.01)
(Continued)

(52) U.S. Cl.
CPC ...... *H04L 65/1094* (2022.05); *H04L 65/1016* (2013.01); *H04L 65/1063* (2013.01); *H04L 65/1073* (2013.01); *H04W 60/00* (2013.01)

(58) Field of Classification Search
CPC ............. H04L 65/1094; H04L 65/1016; H04L 65/1063; H04L 65/1073; H04L 65/1046;
(Continued)

(56) References Cited

U.S. PATENT DOCUMENTS

| 10,455,093 | B1* | 10/2019 | Gaviria Velez ... H04M 3/42263 |
| 2011/0194554 | A1* | 8/2011 | Gavita ................ H04L 65/1104 370/352 |

(Continued)

OTHER PUBLICATIONS

International Search Report and the Written Opinion of the International Searching Authority, issued in corresponding International Application No. PCT/SE2019/050513, dated Feb. 6, 2020, 13 pages.

(Continued)

*Primary Examiner* — Karen C Tang
(74) *Attorney, Agent, or Firm* — Rothwell, Figg, Ernst & Manbeck, PC

(57) ABSTRACT

A method performed by a network node, for handling an outgoing media call of a user associated with multiple User Equipment, UEs, in a communications network is provided. The network node receives (402) a request for the outgoing media call to be set up from a first UE out of the multiple UEs. The request is obtained as a voice instruction 5 from the user via a Digital Assistant, DA, device. The voice instruction comprises a personalized name associated with the first UE. The network node further identifies (403) among the multiple UEs, the first UE and its associated IP Multimedia Subsystem, IMS, identifier based on the personalized name received in the voice instruction. The network node further sends (404), to an IMS node, the identified IMS identifier of the first UE and a 10 request to whether or not the first UE is registered in the IMS node and supports media of the outgoing media call. When the first UE is registered in the IMS node and supports the media of the outgoing media call, the network node initiates (405) the outgoing media call from the first UE. When the first UE is not registered in the IMS node and/or does not support the media of the outgoing media call, the network node decides (406) how to 15 proceed with the outgoing media call.

17 Claims, 12 Drawing Sheets

(51) Int. Cl.
*H04L 65/1016* (2022.01)
*H04L 65/1063* (2022.01)
*H04L 65/1073* (2022.01)
*H04W 60/00* (2009.01)

(58) Field of Classification Search
CPC . H04L 65/1069; H04L 65/1086; H04L 69/24; H04W 60/00; H04M 2207/185; H04M 3/38; H04M 3/42263
USPC .......................................................... 709/231
See application file for complete search history.

(56) References Cited

U.S. PATENT DOCUMENTS

| | | |
|---|---|---|
| 2017/0111404 A1 | 4/2017 | Noldus |
| 2018/0332084 A1* | 11/2018 | Choe .................. H04L 65/1073 |
| 2018/0338037 A1 | 11/2018 | Ly et al. |

OTHER PUBLICATIONS

OMA-TS-NGSI_Call_Control_and_Configuration-V1_0-20120529-A, NGSI Call Control and Configuration, Approved Version 1.0—May 29, 2012, Open Mobile Alliance, 45 pages.

* cited by examiner

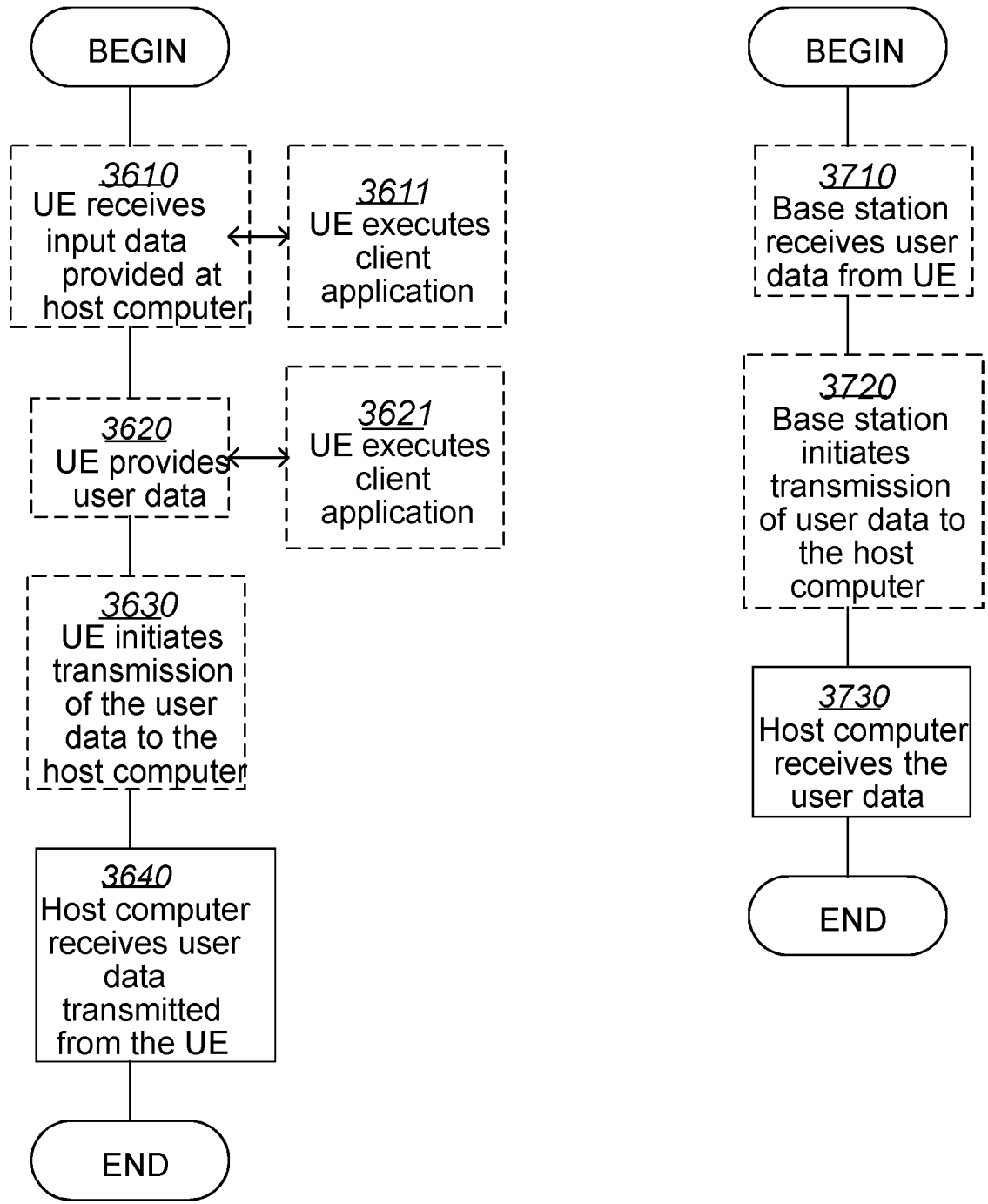

NETWORK NODE, IMS NODE AND METHODS IN A COMMUNICATIONS NETWORK

CROSS REFERENCE TO RELATED APPLICATION(S)

This application is a 35 U.S.C. § 371 National Phase Entry Application from PCT/SE2019/050513, filed Jun. 4, 2019, designating the United States, the disclosure of which is incorporated herein by reference in its entirety.

TECHNICAL FIELD

Embodiments herein relate to a network node, an IMS node and a methods therein. In particular, they relate to for handling an outgoing media call of a user associated with multiple User Equipments (UEs) in a communications network.

BACKGROUND

In a typical wireless communication network, wireless devices, also known as wireless communication devices, mobile stations, stations (STA) and/or user equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Over-The-Top (OTT) services have been introduced allowing a third party telecommunications service provider to provide services that are delivered across an Internet Protocol (IP) network. The IP network may e.g. be a public internet or cloud services delivered via a third party access network, as opposed to a carrier's own access network. OTT may refer to a variety of services including communications, such as e.g. voice and/or messaging, content, such as e.g. TV and/or music, and cloud-based offerings, such as e.g. computing and storage.

A further OTT service is a Digital Assistant (DA). The DA may perform tasks or services upon request from a user of a UE. The DA may be implemented in several ways. A first way is commonly referred to as an operator controlled DA. The operator controls the whole DA solution without the UE being impacted. A user of the UE may provide instructions, such as e.g. voice commands, to a core network node, such as e.g. an IP Multimedia Subsystem (IMS) node, of the operator. The voice command may e.g. be "Digital Assistant, I want a pizza", "Digital Assistant, tell me how many devices are active right now", "Digital Assistant, set-up a conference", or "Digital Assistant, how much credit do I have?". IMS is a general-purpose, open industry standard for voice and multimedia communications over packet-based IP networks. It is a core network technology, that may serve as a low-level foundation for technologies like Voice over LTE (VoLTE) Voice over IP (VoIP), Push-To-Talk (PTT), Push-To-View, Video Calling, and Video Sharing.

The core network node may detect a hot word, which may also be referred to as a key word, indicating that the user is providing instructions to the DA and may forward the instructions to a network node controlled by a third party service provider, the network node may e.g. comprise a DA platform.

The DA platform may e.g. be a bot of a company providing a certain service, such as e.g. a taxi service or a food delivery service. The instructions may be forwarded to the DA platform using e.g. a Session Initiation Protocol/Real-time Transport Protocol (SIP/RTP). The DA platform may comprise certain functionality, such as e.g. Speech to Text (Speech2Text), Identification of Intents & Entities and Control & Dispatch of Intents.

The DA platform may then forward the instructions to a further network node, which may e.g. be an Application Server (AS) node, which has access to the core network node via a Service Exposure Application Programming Interface (API). Thereby the DA may access the IMS node and perform services towards the core network node.

The DA platform is often required to pay a fee to the operator in order to be reachable by the operator's DA users.

The user may also be required to pay fees to the operator and network provider for the usage of DA services. The operator may further be required to pay fees to the network provider for every transaction performed via the Service Exposure API.

A further way to implement the DA may be to provide the user with direct access to the network node controlled by the third party service provider comprising the DA platform. This may e.g. be done using a dedicated UE having access to the first network node. This way of implementing the DA is commonly referred to as an OTT-controlled DA.

One of the services that can be invoked may e.g. be a telephony services or bot, implemented by the operator.

FIG. 1 depicts an architecture for an OTT-controlled DA, e.g. a Telephony Bot Architecture. A user 10 of a DA comprising a smart speaker 20 may want to request actions, such as Call Bob, to an IMS network 30 e.g. comprising VoLTE, via an API Gateway 40. If the request from the smart speaker 20 user 10 needs some IMS capabilities, a OTT DA cloud 50 will use service exposure capabilities to access to it. This may for example be, when the user 10 asks to include a 3rd person to the call or manipulate end user supplementary setting.

As mentioned above, A DA may handle communication via an API. In the context of an API, an intent is an abstract description of an operation to be performed. The text describing an intent and other aspects of API:s, when used herein, is written with the text font Courier New Italic.

In the case of an OTT-controlled DA, the DA may handle communication of a user via an Open Mobile Alliance (OMA) API. In section 5.1.3.1 of the Open Mobile Alliance™ specification, it is stated that for the Operation Make Call Session (Makecallsession) in the "OMA API Call Control and Configuration", an API may be invoked in order to set-up a call with a user or with a list of users. A Call Participants (CallParticipants) parameter comprises addresses of the participants involved in the call.

When an application invokes this OMA API, the network will setup a call among all the specified participants.

SUMMARY

As a part of developing embodiments herein the inventors identified a problem which first will be discussed.

As mentioned above, voice driven and/or hands-free use cases are increasing in popularity. Typically, if a user wishes to make a an outgoing call, it is done from one of the devices belonging to that user. This is true also in the cases where the user has multiple devices, such as e.g. a TV, phone, tablet etc. It is implicit which device the user is using to perform the call.

There is today no way in an outgoing call to request a Digital Assistant to request a call to be initiated from a specific UE among the multiple UEs of a user.

There is no such exposure available today. The OMA standard list of APIs, for example, does not provide an operation to expose this action. The API MakeCallSession, mentioned above, does not include any parameter with an identifier for the device from which the call is made.

An object of embodiments herein is improve the performance of a communications network comprising multi device users using DAs.

According to an aspect of embodiments herein, the object is achieved by a method performed by a network node, for handling an outgoing media call of a user associated with multiple User Equipments, UEs, in a communications network. The network node receives a request for the outgoing media call to be set up from a first UE out of the multiple UEs. The request is obtained as a voice instruction from the user via a Digital Assistant, DA, device. The voice instruction comprises a personalized name associated with the first UE.

The network node further identifies among the multiple UEs, the first UE and its associated IP Multimedia Subsystem, IMS, identifier based on the personalized name received in the voice instruction.

The network node further sends, to an IMS node, the identified IMS identifier of the first UE and a request to whether or not the first UE is registered in the IMS node and supports media of the outgoing media call.

When the first UE is registered in the IMS node and supports the media of the outgoing media call, the network node initiates the outgoing media call from the first UE.

When the first UE is not registered in the IMS node and/or does not support the media of the outgoing media call, the network node decides how to proceed with the outgoing media call.

According to another aspect of embodiments herein, the object is achieved by a method performed by an IMS node, for handling an outgoing media call of a user associated with at least one first User Equipment, UE, out of multiple UEs, in a communications network. The IMS node receives from a network node, an IMS identifier of the first UE and a request to whether or not the first UE is registered in the IMS node and supports media of the outgoing media call.

When the first UE is registered in the IMS node and supports the media of the outgoing media call, the IMS node terminates the outgoing media call from the first UE.

When the first UE is not registered in the IMS node and/or does not support the media of the outgoing media call, the IMS node sends a response to the network node, which response comprises a message that the media call cannot be terminated from the first UE.

According to a further aspect of embodiments herein, the object is achieved by a network node configured to handle an outgoing media call of a user associated with multiple UEs in a communications network. The network node is further configured to:

Receive a request for the outgoing media call to be set up from a first UE out of the multiple UEs, which request is adapted to be obtained as a voice instruction from the user via a Digital Assistant, DA, device, which voice instruction is adapted to comprise a personalized name associated with the first UE, identify among the multiple UEs, the first UE and its associated IP Multimedia Subsystem, IMS, identifier based on the personalized name adapted to be received in the voice instruction, send to an IMS node, the identified IMS identifier of the first UE and a request to whether or not the first UE is registered in the IMS node and is configured to support media of the outgoing media call, when the first UE is registered in the IMS node and configured to support the media of the outgoing media call, initiate the outgoing media call from the first UE, and when the first UE is not registered in the IMS node and/or is not configured to support the media of the outgoing media call, decide how to proceed with the outgoing media call.

According to a yet further aspect of embodiments herein, the object is achieved by an IMS node configured to handle an outgoing media call of a user associated with at least one first User Equipment, UE, out of multiple UEs, in a communications network. The IMS node is further configured to:

Receive from a network node, an IMS identifier of the first UE and a request to whether or not the first UE is registered in the IMS node and is configured to support media of the outgoing media call, when the first UE is registered in the IMS node and is configured to support the media of the outgoing media call, terminate the outgoing media call from the first UE, and when the first UE is not registered in the IMS node and/or is not configured to support the media of the outgoing media call, send a response to the network node, which response is configured to comprise a message that the media call cannot be terminated from the first UE.

An advantage of embodiments herein is that call initiation from a DA smartspeaker or from a DA smartapp using voice control, e.g. in a multi-device scenario, is made possible. Thus, embodiments herein enable an implementation of cases with e.g. outgoing voice calls without the need for interaction with an actual calling device, since they may be voice driven via a DA.

Consequently, through the embodiments herein, the performance of a communications network comprising multi device users using DAs is improved.

BRIEF DESCRIPTION OF THE DRAWINGS

Examples of embodiments herein are described in more detail with reference to attached drawings in which:

FIGS. 11 to 14 are flowcharts illustrating methods implemented in a communication system including a host computer, a base station and a user equipment.

DETAILED DESCRIPTION

Example embodiments herein may be based on an IMS network exposing an action to initiate a call from a specific user's UE.

In some embodiments herein, exposing the action to initiate a call from a specific user's UE provides the following use case to be implemented:

Upon a user e.g. requesting the DA to call another user from a TV, the DA will request to an IMS node in the IMS network to fulfill the given request via an exposed API. The IMS node may perform a check to verify whether the UE is registered in the IMS node. The IMS node may also perform a check to verify whether the UE supports the specified media.

Example embodiments herein enables voice controlled selection of which one of a user's multiple UEs that should be used for an outgoing call. Furthermore, embodiments herein e.g. enable voice controlled selection of which media format that should be used for an outgoing call. Media formats may e.g. comprise audio and/or voice calls and video calls.

In some embodiments herein, an existing API may be updated, or, as an alternative, a new API may be created. In an example embodiment, an OMA API MakeCallSession with parameters participants and callingDevice may be defined. In such a new or updated API, the participants may be specified by means of a userId which may be the IMS privateId. The callingDevice may be specified by means of a universally unique identifier, uuid, representing the UE from which the user wants to initiate the call. The returned value may be the result of the operation, i.e. success or failure.

Embodiments herein provide a way to request a Digital Assistant to request a call to be initiated from a specific UE among the multiple UEs the user owns e.g. by means of an API according to embodiments herein.

According to some embodiments herein, therefore, a creating of a new API or an update of the existing OMA API MakeCallSession is provided to include an IMS Identifier, such as the UUID. This function may be performed by an application server, such as e.g. a Multimedia Telephony Application Server, MTAS, IMS node 130. The MTAS IMS Node 130 would be suitable for exposing this function since it is the natural IMS node where the logic is to be placed, and it does not preclude other nodes for implementation. A logic when used herein means a function that maps the indicated device to the IMS device identifier, i.e. couples an indicated device to an IMS identifier. An appropriate logic comprises the indication of the device the call is originated from.

Exposing the function may also be performed by any other IMS Application Server handling calls.

Figure 2:
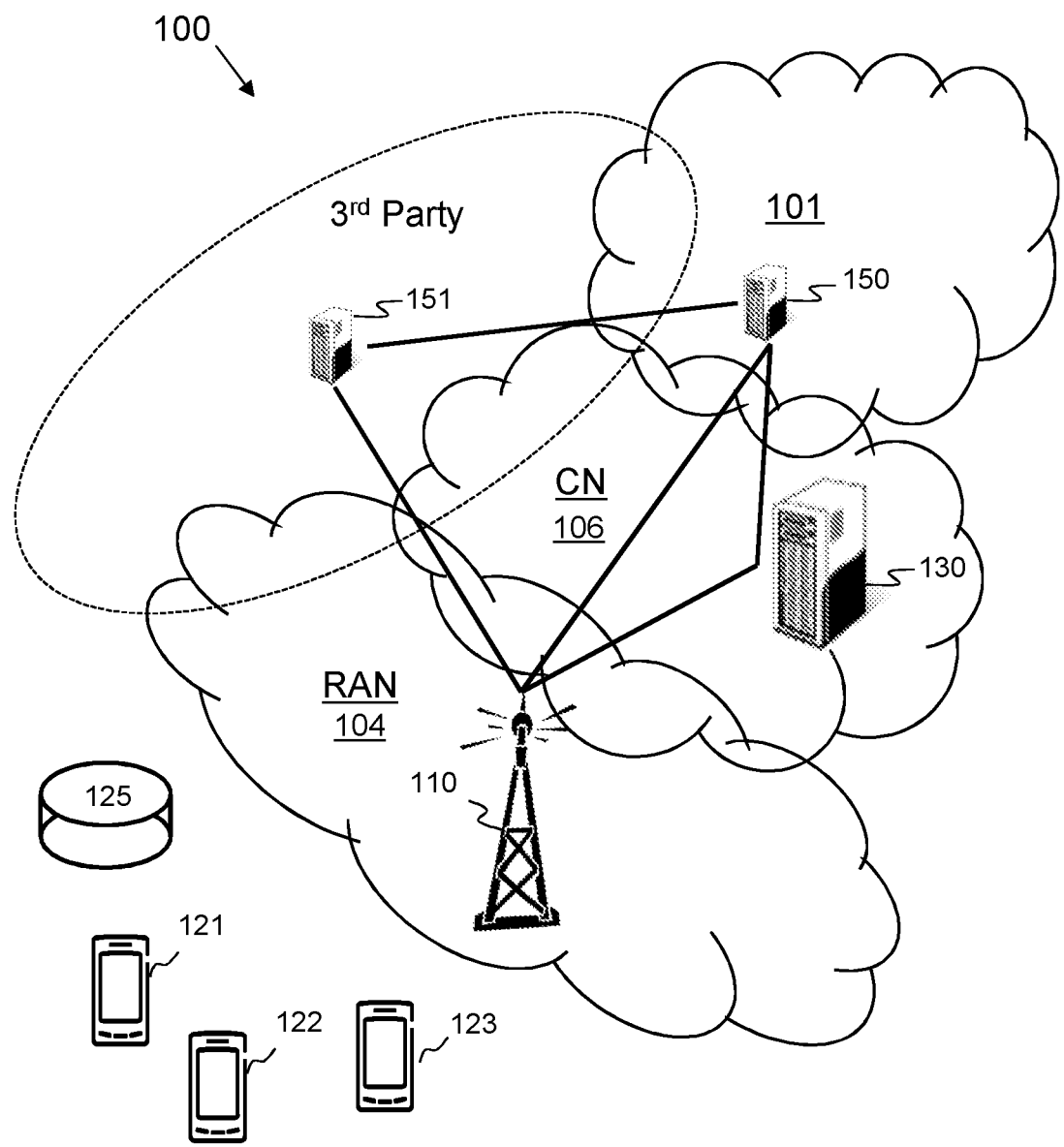
FIG. 2 is a schematic block diagram illustrating embodiments of a communications network.

FIG. 2 is a schematic overview depicting a wireless communications network 100 wherein embodiments herein may be implemented. The wireless communications network 100 comprises one or more RANs 104 and one or more CNs 106. The wireless communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a radio network node 110 providing radio coverage.

The radio network node 110 provides radio coverage over a geographical area by means of antenna beams. The geographical area may be referred to as a cell, a service area, beam or a group of beams. The radio network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by the radio network node 110 depending e.g. on the radio access technology and terminology used.

UEs such as a UEs 121, 122 and 123 operate in the wireless communication network 100. The UEs 121, 122, 123 may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets, television units or even a small base station communicating within a cell.

Figure 1:
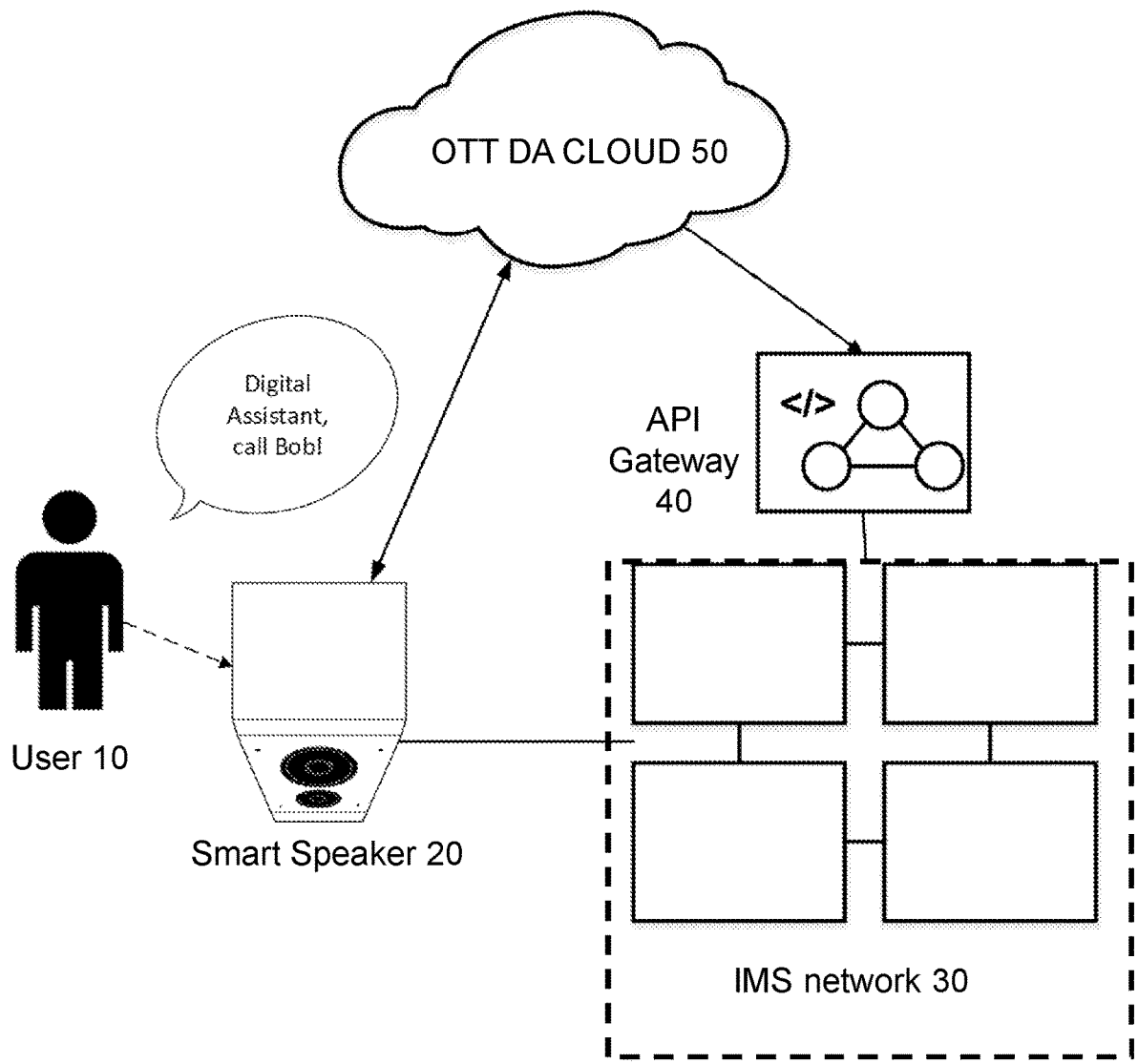
FIG. 1 is a schematic block diagram illustrating prior art.

The CN further comprises an IP Multimedia Subsystem (IMS) node 130. The IMS node 130 may be connected to a network node 150. The network node 150 is represented by an Application Server (AS) node. The network node 150 may be located in a cloud 101 as depicted in FIG. 1, in the CN or in a $3^{rd}$ Party domain of the communications network. The network node 150 may act as a gateway to a platform node 151 located in a $3^{rd}$ Party domain of the communications network 100. Furthermore the IMS node 130, the network node 150 and the platform node 151 may be collocated nodes, stand-alone nodes or distributed nodes comprised in a cloud 101, 106.

In some embodiments, the DA may comprise a DA device 125 and the platform node 151. The DA device 125 may e.g. be a smart speaker. The platform node 151 may, as described above, be located in a third party domain and be represented by e.g. be an OTT DA Cloud It should be noted that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

The method will first be described from a helicopter perspective as a signalling diagram showing involved nodes such as the DA device 125, the network node 150 and the IMS node 130 with reference to FIG. 3. Thereafter embodiments of the method as seen from the perspective of the network node 150 and the IMS node 130, respectively, will be individually described one by one with reference to FIGS. 4 and 5.

Figure 3:
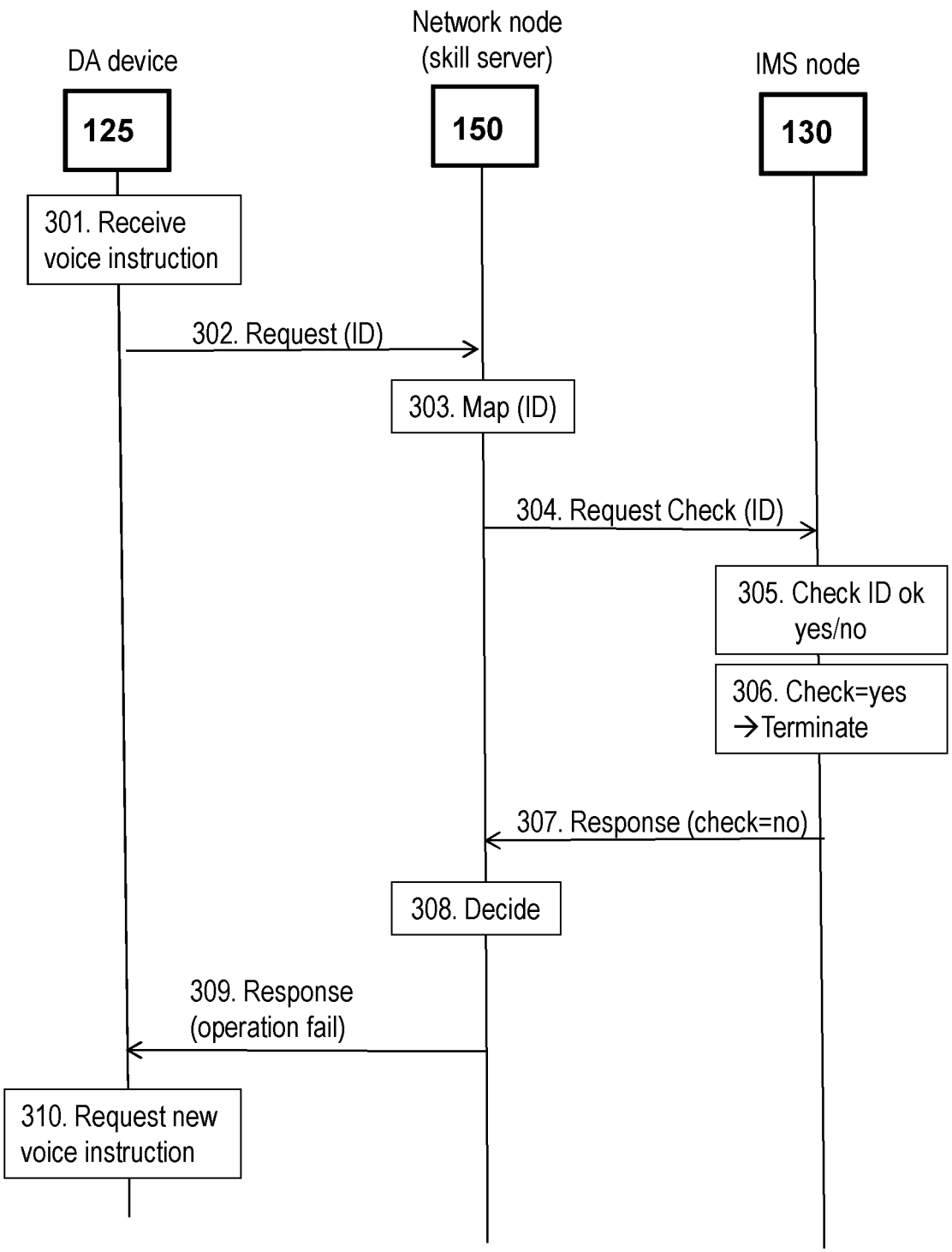
FIG. 3 is a schematic overview depicting embodiments of a method in the communications network.

An example of a use case of embodiments herein is depicted in FIG. 3 and will be explained by means of the following example scenario. The actions in FIG. 3 are referred to in the text by their respective reference signs in parentheses, e.g. (301).

A user A is a multi-device user who has, e.g. owns, multiple UEs 121, 122, 123. The multiple UEs 121, 122, 123 may e.g. be a smartphone, a fixed telephone and a TV. User A uses various media formats for making calls, such as e.g. voice (audio) and video calls. The calls may be referred to as media calls, since they may be made using various media formats.

The user A wants to call another user, user B, from a specific UE, such as the UE 121. The UE 121 may have video call capabilities and, in this example, user A wants to make a video call to user B.

To make a video call to the user B from the UE 121, the user A would provide a voice instruction to the DA device 125. The user A may e.g. say "Digital assistant, make a video call to user B from the UE 121". In the example scenario, the user A requests the digital assistant to set up a video call from the UE 121 to the user B and, thus, the DA device 125 receives (301) a voice instruction from the user A.

The request is thereafter sent (302) to the network node 150. The request may be sent in a message, e.g. comprising identifiers for the intended participants in the call, the user B in the example scenario, and the device from which the call is to be initiated, the UE 121 in the example scenario. The identifier for user B may be a personalized name configured by the user A, or an IMS Public Identity, IMPU, corresponding to the user B. The nature of the identifier depends on where in the system the mapping of personalized names to corresponding digital IDs, such as IMPUs, is performed. The identifier for the UE 121 may be a personalized name assigned to the UE 121 by user A, such as "TV".

According to embodiments herein, the network node 150, having received the request with the included IDs, performs (303) a mapping. Mapping may e.g. mean that the network node 150, knowing the personalized name, may e.g. check in a list to identify an ID corresponding to that particular personalized name. The result of the mapping is thus that an IMS identifier corresponding to the personalized name is identified, i.e. an IMS identifier corresponding to the name "TV" for the UE 121 in the example scenario. The IMS identifier may e.g. be a Universally Unique Identifier, UUID for the UE 121.

Thereafter, according to embodiments herein, a request is sent (304) form the network node 150 to the IMS node 130 to perform a check. The check involves verifying if the requested UE 121 is registered in the IMS node 130 and if it supports the requested media format. In the example scenario, the request would be to check whether the UE 121 is registered in the IMS node 130 and supports video calls.

Having received the request, the IMS node 130 performs the requested check (305). If the result of the check is that the requested UE is registered and supports the requested format, the call may be terminated (306). In the example scenario, if the UE 121 is registered and supports video call, the requested video call may be successfully set up between user A and user B, from the UE 121, i.e. the "TV". A response may also be sent back to the network node 150 indicating that the operation was successful.

If, on the other hand, the result of the check is that the requested UE 121 is not registered in the IMS node and/or does not support the requested format, the call cannot be terminated. A response may therefore be sent (307) back to the network node 150.

The response may comprise a message that the operation was not successful with the given parameters. In the example scenario, the message is sent that either the IMS identifier for UE 121 is not registered in the IMS node 130 and/or that UE 121 does not support the requested media format.

The network node 150 may then decide (308) how to proceed with the process of setting up the call.

In some embodiments herein, the network node 150 will send a response (309) to the DA device 125 indicating the result of the operation as requested. Furthermore, the message may include instructions for how to proceed with handling the requested media call, in accordance with what has been decided by the network node. In the example scenario the response may comprise instructing the DA device 125 to tell user A that the UE 121 was not accepted for the requested call.

Having received the response from the network node 150, the DA device 125 may have been instructed to ask (310) user A to provide new or additional instructions for how to handle the requested media call. In the example scenario, the DA device 125 may ask the user A to select an alternative device from which to call, such as from the UE 122. The alternative device may be referred to by the UE with the personalized name so that it is recognizable to the user A. Consequently, in order to enable this, a mapping between personalized names among the multiple UEs 121, 122, 123 associated with user A may have been previously performed.

Alternatively, the DA device 125 may ask user A to select an alternative media format for the requested media call.

Thereafter, the flow according to FIG. 3 may be repeated until a successful operation has been performed and a media call may be terminated between user A and user B.

To enable the process shown in FIG. 3, the IMS node 130 may expose an API to network node 150. As mentioned above, in some embodiments herein, the API MakeCallSession may be used with parameters participants, and callingDevice. The participants may be specified by means of a userId which may be the IMS privateId. and the callingDevice may be specified by means of the uuid representing the UE from which the user wants to initiate the call.

Using the example embodiment depicted in FIG. 3 and explained above, an example use case for the above API may be explained as follows.

In the example embodiment, the OMA API MakeCallSession may be altered to fit the desired operation. A MakeCallSession request is to be made, which requires input parameters. These parameters may be expressed as participants and callingDevice.

The Participants parameter may represent one or more users that should receive the outgoing call. In this example embodiment, there is only one participant—the user B. The user B may be identified with a userId, which for the purpose of MakeCallSession is the publicId which may be his/her allocated IMPU. The IMPU is a unique permanently allocated global identity assigned by the home network operator.

The callingDevice parameter may be the UE that is intended to be used for the call. In this example embodiment, the callingDevice is the UE 121. The callingDevice may be identified using an IMS identifier, such as the UUID) associated with that device.

In order to translate the UE name employed by the user to an IMS identifier, the DA system may be configured so that there is a mapping between a device ID of the UE, such as the IMS identifier, and a personalized name associated with that UE: The personalized name is the name that is said by the user in the voice instruction to the DA device 125. In the example embodiment, the personalized name for the requested UE, UE121, may e.g. be "TV".

Thus, in the example embodiment, the MakeCallSession would be given the parameters:

the IMPU corresponding to the user B, and
the IMS identifier corresponding to the UE 121, which user A calls "TV".

In some embodiments, it may be possible that the operator has a mapping between the IMS identifier and the personalized name for a user's devices. The operator may for example have registered that <urn:uuid:6ba7b810-9dad-11d1-80b4-00c04fd430c4> corresponds to the spoken words "Living room TV". Furthermore, the user may use the UUID for the device instead of assigning a personalized name.

Figure 4:
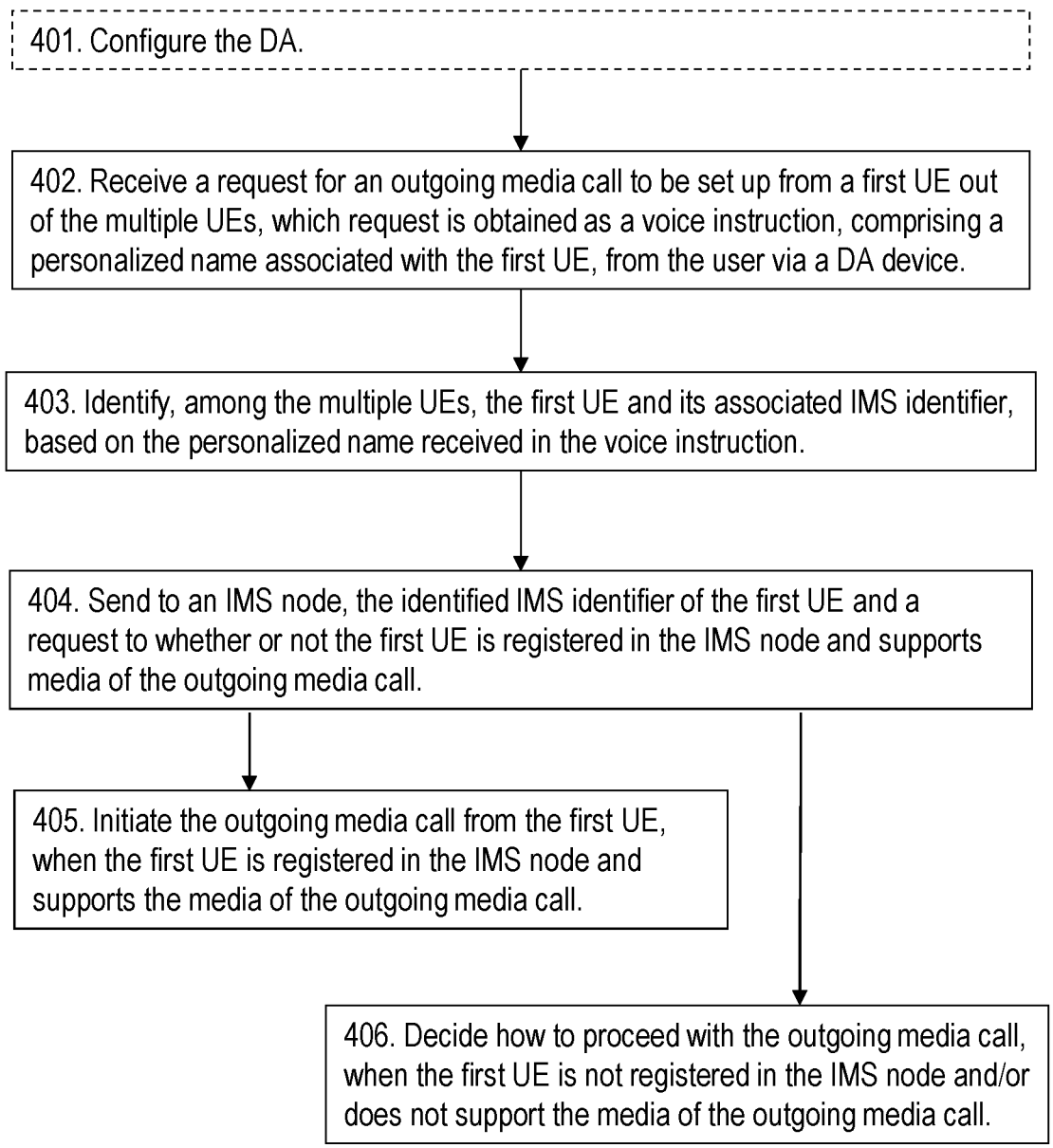
FIG. 4 is a flowchart depicting embodiments of a method in a network node.

Example embodiments of a method performed by the first network node 150, for handling an outgoing media call of a user A associated with the multiple UEs, 121, 122, 123 in a communications network 100, will now be described with reference to a flowchart depicted in FIG. 4.

The first network node 150 may be represented by an application server node.

The method comprises the following actions, which actions may be taken in any suitable order. Actions that are optional are presented in dashed boxes in FIG. 4.

Action 401

In order to facilitate a mapping between personalized names for the multiple UEs and their corresponding IMS identifiers, the DA device 125 may first be configured by the user.

In an example scenario herein, the user A is associated with multiple devices: UEs 121, 122 and 123. The configuration, which may be an automatic configuration phase, when exemplified with the scenario involving user A may comprise the following:

User A sets up the DA device 125 to manage his/her IMS devices, i.e. UEs 121, 122, 123.

The DA device 125 triggers an application server, such as the MTAS, to start a set up phase.

One by one, each device may ring, optionally employing a special tone so that the device is easily identified.

User A instructs the DA device 125 what personalized name he/she wants to allocate to the alerted UE 121, 122, 123, such as "my cellphone", "TV", "old phone" etc.

A set-up completion may be performed, optionally involving dummy test calls.

When the set-up is completed, the DA device 125 is configured so that the personalized names employed by the user A are coupled with digital identifiers that may be employed by the various nodes in the communications network 100.

In some embodiments, when a user is associated with multiple personas, such as "work", "family" etc., the configuration may further include coupling personalized names for each out of the multiple personas with a digital identifier. These identifiers may then be employed by the various nodes in the communications network 100, in a scenario when a user requests to set up a call using a specific persona.

Action 402

The network node 150 receives a request for the outgoing media call to be set up from a first UE 121 out of the multiple UEs 121, 122, 123. The request is obtained as a voice instruction from the user A via the Digital Assistant, DA, device 125. The voice instruction comprises a personalized name associated with the first UE 121.

The request for the outgoing media call to be set up from the first UE 121 out of the multiple UEs 121, 122, 123 may further comprise an indication of a media format of the media to be used in the outgoing media call. The media format may be specified by the user A in the voice instruction.

Furthermore, the request obtained as a voice instruction from the first user A may further comprise a request for the outgoing call to be set up via a first persona out of multiple personas associated with the first user A. The voice instruction may further comprise a personalized name associated with the first persona of the first user A.

Action 403

After the network node 150 has received the request from the user via the DA device 125, the network node identifies among the multiple UEs 121, 122, 123, the first UE 121 and its associated IMS identifier based on the personalized name received in the voice instruction.

Additionally, identifying may in some embodiments further comprise identifying among the multiple personas associated with the first user A, an IMS user ID based on the personalized name associated with the first persona of the first user A received in the voice instruction.

Action 404

When the IMS identifier of the first UE 121 has been identified, the network node 150 sends the identified IMS identifier to the IMS node 130. The network node also sends and a request to the IMS node 130 to check whether or not the first UE 121 is registered in the IMS node 130 and supports media of the outgoing media call. The media of the outgoing media call may e.g. be audio/voice or video.

In some embodiments herein, when an IMS user ID based on the personalized name associated with the first persona of the first user A has been identified, the identified IMS user ID may be sent by the network node 150 to the IMS node 130.

Action 405

After having received a request to perform the check to see whether or not the first UE 121 is registered in the IMS node 130 and supports media of the outgoing media call, the IMS node 130 sends a response to the network node 150 indicating the result of the check.

Thus, when the first UE 121 is registered in the IMS node 130 and supports the media of the outgoing media call, the network node 150 is informed of this by the IMS node 130. The network node 150 then initiates the outgoing media call from the first UE 121. The initiation may comprise sending a request to the IMS node to terminate the outgoing media call.

Action 406

After having received the request and performed the check to see whether or not the first UE 121 is registered in the IMS node 130 and supports media of the outgoing media call, the IMS node 130 sends a response to the network node 150 indicating the result of the check.

Thus, when the first UE 121 is not registered in the IMS node 130 and/or does not support the media of the outgoing media call, the network node 150 may be informed of this by the IMS node 130. The network node 150 then decides how to proceed with the outgoing media call.

According to some embodiments herein, deciding how to proceed with the outgoing media call may comprise one of:

Instructing the DA device 125 to offer the user to set up the outgoing media call on a second UE 122 out of the multiple UEs 121, 122, 123;

instructing the DA device 125 to request the user to select an alternative UE among the multiple UEs 121, 122, 123 to set up the outgoing media call; or instructing the DA device 125 to tell the user 120 that the pick-up of the incoming media call on the first UE 121 is not possible.

Method in the IMS node 130

Figure 5:
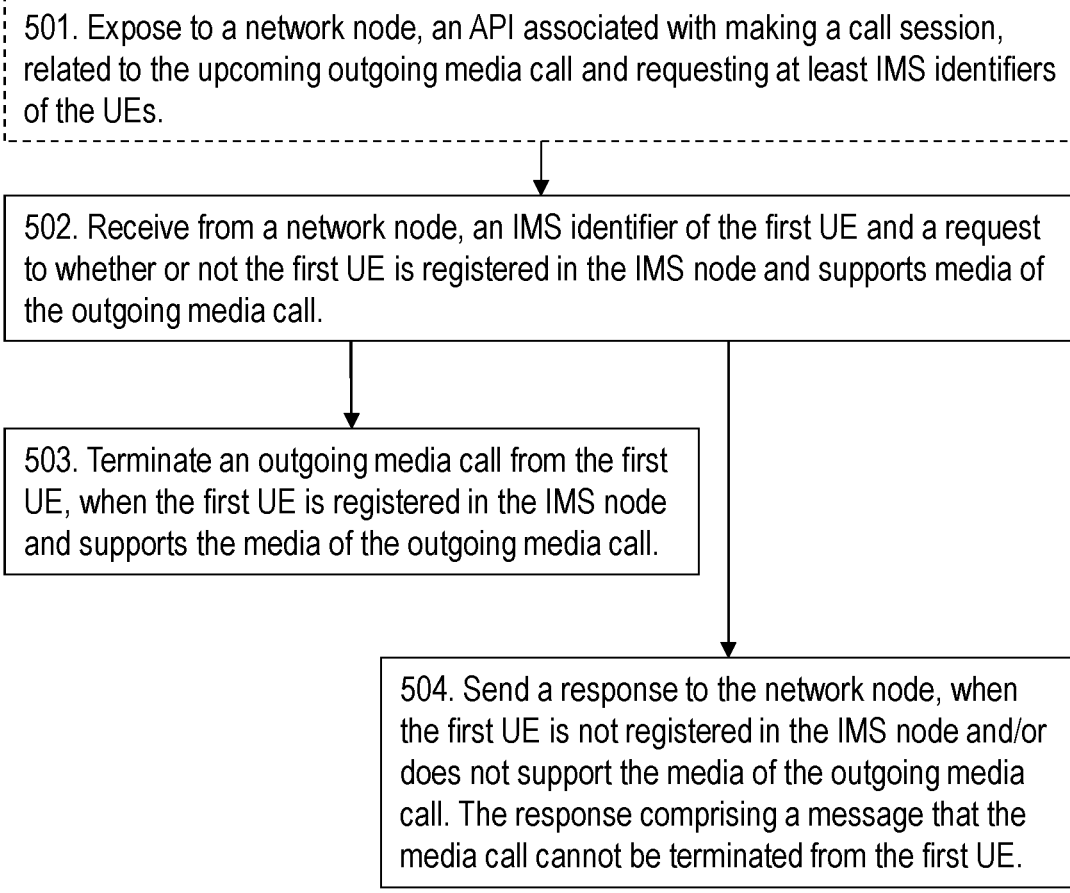
FIG. 5 is a flowchart depicting embodiments of a method in an IMS node.

Example embodiments of a method performed by the IMS node 130, for handling an outgoing media call of the user A associated with at least one first UE 121 out of multiple UEs 121, 122, 123 in a communications network 100 will now be described with reference to a flowchart depicted in FIG. 5.

The method comprises the following actions, which actions may be taken in any suitable order. Actions that are optional are presented in dashed boxes in FIG. 5.

Action 501

In order to facilitate handling of an upcoming outgoing media call, the IMS node 130 may expose an API to the network node 150. The API comprises parameters associated with making a call session related to the upcoming outgoing media call, and requests at least IMS identifiers of the UEs 121, 122, 123.

The wording to expose when used herein, means to make accessible, such as e.g. to provide access to authorized clients to the network capabilities via an API.

The parameters of the API may e.g. comprise any one out of: intended participants in the media call, defined by corresponding User IDs; and the respective IMS identifier defining any one out of the multiple UEs 121, 122, 123.

The User ID for the intended participants may correspond to an IMS Public Identity (IMPU) and the respective IMS identifier for any one out of the multiple UEs 121, 122, 123 may be a Universally Unique Identifier (UUID) for the respective UE.

Action 502

For handling an outgoing media call of the user A associated with at least one first UE 121 out of multiple UEs 121, 122, 123, the IMS node 130 first receives an IMS identifier of the first UE 121 and a request from a network node 150. The request comprises to check whether or not the first UE 121 is registered in the IMS node 130 and supports media of the outgoing media call.

In some embodiments herein, the IMS node 130 may further receive an IMS user ID associated with a first persona of the first user A and a request to check whether or not the first persona of the first user A is registered in the IMS node 130 and supports the outgoing media call. This check may e.g. be performed via service exposure, i.e. an API exposed by the IMS, for example by the MTAS.

Action 503

After having performed the check to see whether or not the first UE 121 is registered in the IMS node 130 and supports media of the outgoing media call, the IMS node 130 takes an action depending on the outcome of the check.

If the result of the check is that the first UE 121 is registered in the IMS node 130 and supports the media of the outgoing media call, the IMS node 130 terminates the outgoing media call from the first UE 121. The IMS node 130 may also send a response to the network node 150 indicating that the outgoing media call may be terminated with the given IMS identifier.

In some embodiments herein, the IMS node 130 may further have received an IMS user ID associated with a first persona of the first user A. The IMS node may then further check whether or not the first persona of the first user A is registered in the IMS node 130 and supports the outgoing media call. This check may e.g. be performed via service exposure, i.e. an API exposed by IMS, for example by the MTAS.

In such an embodiment, the outgoing media call may be terminated, by the IMS node 130, from the first UE 121 using the first persona if:

The first UE 121 is registered in the IMS node 130 and supports the media of the outgoing media call; and the first persona of the first user A is registered in the IMS node 130 and supports the outgoing media call.

Action 504

If, on the other hand, the outcome of the abovementioned check is that the first UE 121 is not registered in the IMS node 130 and/or does not support the media of the outgoing media call, the IMS node 130 sends a response to the network node 150. The response comprises a message informing the network node that the operation was not successful and that, therefore, the media call cannot be terminated from the first UE 121, i.e. with the given IMS identifier.

In some embodiments herein, if the check in the IMS node 130 as shown that a call may not be terminated, by the IMS node 130, from the first UE 121 using the first persona, then the response to network node 150 may further comprise a message that the media call cannot be terminated from the first UE 121 using the first persona.

Embodiments herein such as mentioned above will now be further described and exemplified. The text below is applicable to and may be combined with any suitable embodiment described above.

Figure 6:
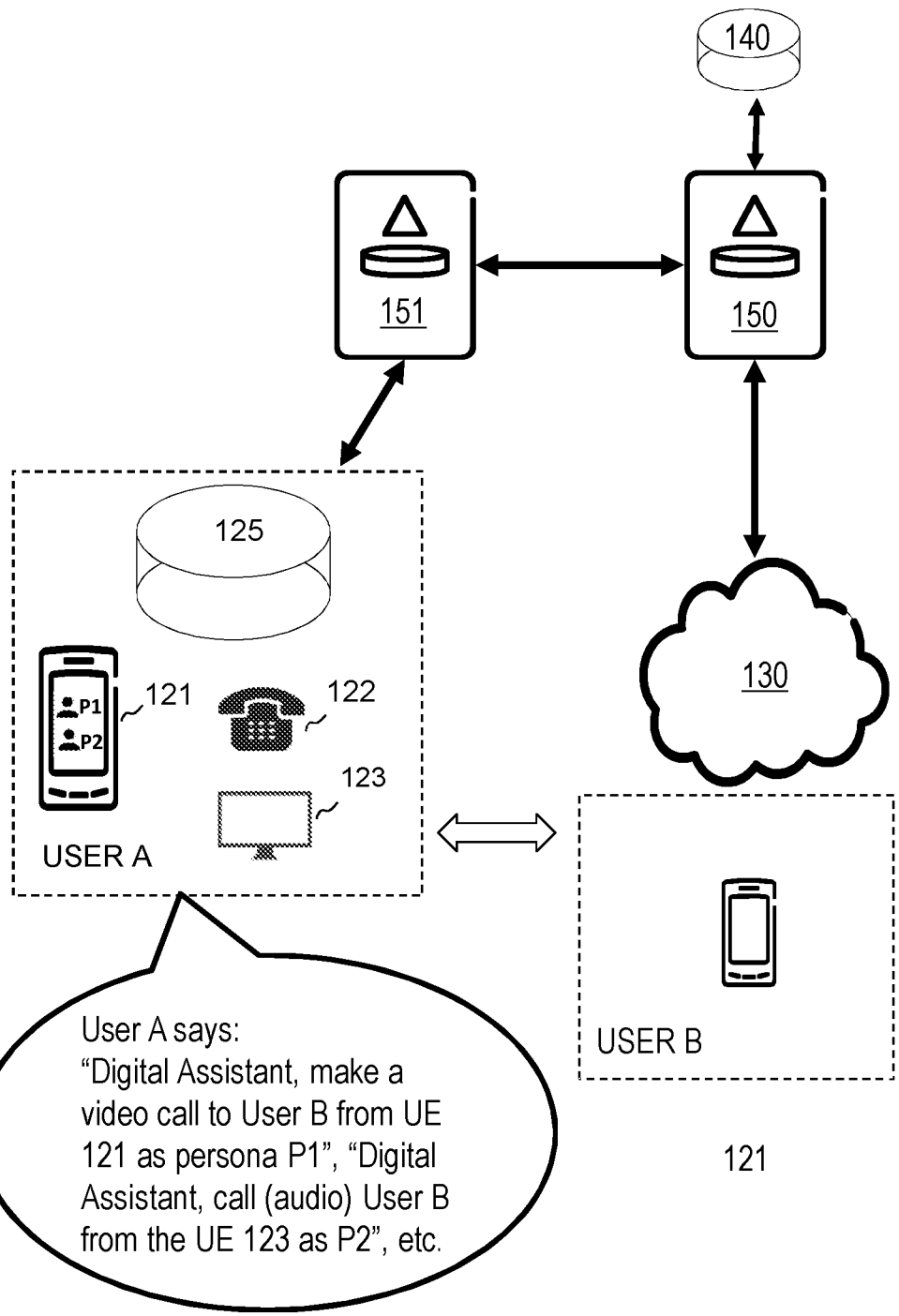
FIG. 6 is a schematic overview depicting embodiments of a method in the communications network.

A further example of an additional use case of embodiments herein is depicted in FIG. 6 and will be explained by means of the following example scenario.

In the scenario depicted in FIG. 6, the user A wishes to set up a call with the user B, similarly to the example scenario depicted in the flowchart in FIG. 3. In FIG. 6 however, in addition to being associated with multiple UEs 121, 122, 123, the user A is also associated with multiple personas P1, P2 etc.

A persona when used herein refers to a persona in the IMS domain which may be a phone number associated with a user's role in life. For example, a user may have one phone number for private use and another one for business purposes. In the example scenario, the user A wants to call the other user B from a specific UE out of the multiple UEs and using a specific persona out of the multiple personas. The user A may e.g. want to call the user B from UE 121 using a first persona, P1. As mentioned above, user A may also request a specific media format to be used for the call. In the example scenario, the user A wishes to make a video call from the first UE 121 using the first persona, P1.

To make a video call to the user B from UE 121 using the first persona P1, user A would provide a voice instruction to the DA device 125. The user A may e.g. say "Digital assistant, make a video call to user B from the UE 121 as persona P1". The digital assistant device would then convey the request to the network node 150, which may be done via a platform node 151.

The network node 150 may then perform a mapping in a similar fashion to what has been described in embodiments above. In this scenario however, the personalized name that user A employs for the first persona P1 may also be mapped to an IMS identifier corresponding to that personalized name. Such an IMS identifier may be referred to as an IMS user ID, as mentioned above. The IMS user ID may e.g. be a telephone number or a Session Initiation Protocol, SIP, identity.

Furthermore, when the request is sent from the network node 150 to the IMS node 130 to perform a check, the check may additionally involve verifying if the requested IMS user ID is registered in the IMS node 130 and supports the outgoing media call. There may be several reasons why an outgoing media call may not be supported by a specific persona. Such reasons may e.g. be if the user has configured the persona in such a way. A company may e.g. not allow a user to make outgoing calls from his/her business persona after office hours.

In the example scenario, the request would be to check whether:

The UE 121 is registered in the IMS node 130 and supports video calls, and the first persona P1 is registered in the IMS node 130 and the outgoing call.

Only if both checks generate a positive result may the outgoing call be terminated. This means that the call cannot be terminated from a registered UE that supports a requested media format if the requested persona is not registered in the IMS node and/or does not support the outgoing call. In the example scenario, the requested persona P1 may e.g. not support calling the user B if user B is a family contact and the first persona P1 is a work persona.

Another example of when the outgoing call may not be supported may be that calling the user B means setting up an international call as the first persona P1, which may not be permitted. This restriction imposed on the first persona P1 would be known to the IMS node 130, and the IMS node 130 would therefore send a response to the network node 150 that terminating the call was not possible with the given identities.

In the example scenario, if the persona P1 is registered in the IMS node 130 and supports the outgoing call, the call may be terminated as long as the UE 121 is registered in the IMS node 130 and supports video calls. In such a scenario, the video call may be set up from the user A, as the first persona P1 using the first UE 121, to the user B.

On the other hand, if the call could not be terminated, the network node 150 may then decide how to proceed with the process of setting up the call. This process is similar to the example scenario depicted FIG. 3, with adequate changes to accommodate the additional possibilities provided by the multiple personas. The DA device 125 may e.g. ask the user A to select an alternative persona for the requested media call.

It should be noted that many combinations of possibilities for the interaction between the DA device 125 and the user are available, and that the choices of actions to take following an unsuccessful operation to terminate a call are by no means limited to those exemplified.

Following an unsuccessful attempt to terminate a call from a specific device, such as the first UE 121 using a specified persona, the flow of interaction described here and depicted in FIG. 6 may be repeated until a successful operation has been performed and a media call may be terminated between the user A and the user B.

Figure 7A:
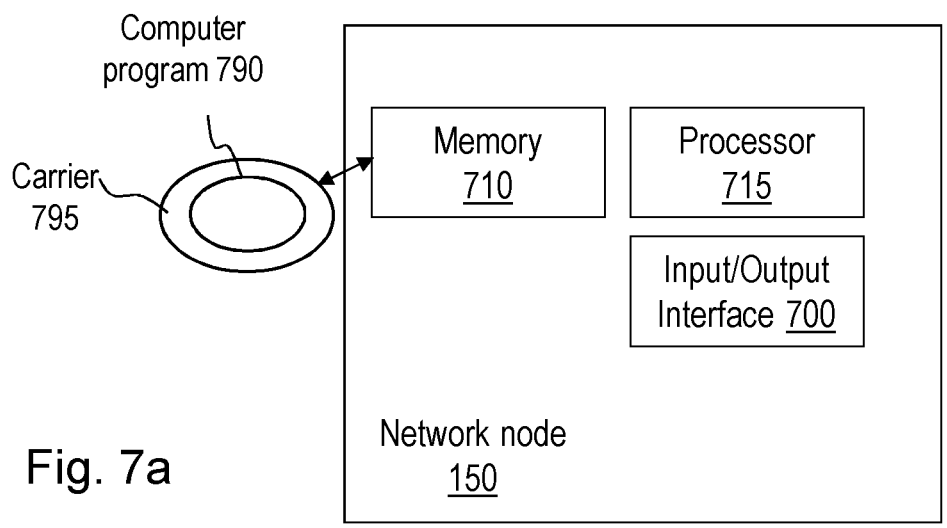
FIGS. 7 a and b are schematic block diagrams illustrating embodiments of a network node.
Figure 7B:
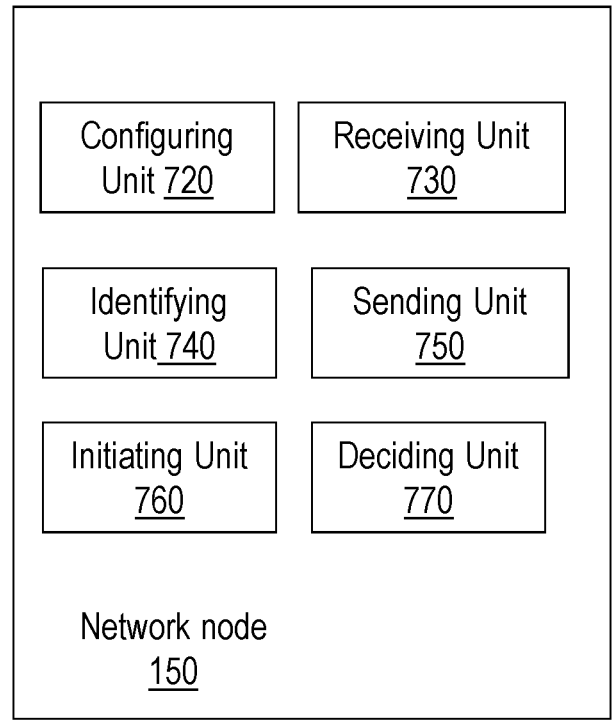

To perform the method actions above for handling an outgoing media call of a user A associated with multiple pieces of User Equipment, UEs, 121, 122, 123 in a communications network 100, the network node 150 may comprise the arrangement depicted in FIG. 7a and FIG. 7b.

The network node 150 may be adapted to be represented by an application server node.

The network node 150 may comprise an input and output interface 700 depicted in FIG. 7a, configured to communicate e.g. with the IMS node 130. The input and output interface 700 may comprise a wireless receiver not shown and a wireless transmitter not shown.

The network node 150 may be configured to, e.g. by means of a configuring unit 720 in the network node 150 depicted in FIG. 7b, initiate a configuration of the DA device.

The network node 150 may further be configured to receive, e.g. by means of a receiving unit 730 in the network node 150 depicted in FIG. 7b, a request for the outgoing media call to be set up from a first UE 121 out of the multiple UEs 121, 122, 123, which request is adapted to be obtained as a voice instruction from the user A via a Digital Assistant, DA, device 125, which voice instruction is adapted to comprise a personalized name associated with the first UE 121.

The request for the outgoing media call to be set up from the first UE 121 out of the multiple UEs 121, 122, 123 may be further configured to comprise an indication of a media format of the media in the outgoing media call, which media format is adapted to be specified by the user A in the voice instruction.

The network node 150 may further be configured to identify, e.g. by means of an identifying unit 740 in the network node 150 depicted in FIG. 7b, among the multiple UEs 121, 122, 123, the first UE 121 and its associated IP Multimedia Subsystem, IMS, identifier based on the personalized name adapted to be received in the voice instruction. The network node 150 may further be configured to identify, e.g. by means of the identifying unit 740 in the network node 150 depicted in FIG. 7b, among the multiple personas associated with the first user A, an IMS user ID based on the personalized name associated with the first persona of the first user A adapted to be received in the voice instruction.

The network node 150 may further be configured to send, e.g. by means of a sending unit 750 in the network node 150 depicted in FIG. 7b, to an IMS node 130, the identified IMS identifier of the first UE 121 and a request to whether or not the first UE 121 is registered in the IMS node 130 and is configured to support media of the outgoing media call.

The request sent to the IMS node 130 may further be adapted to comprise a request for the outgoing call to be set up via a first persona out of multiple personas associated with the first user A, and wherein the voice instruction is further adapted to comprise a personalized name associated with the first persona of the first user A. The network node 150 may further be configured to send, e.g. by means of the sending unit 750 in the network node 150 depicted in FIG. 7b, the identified IMS user ID to the IMS node 130.

When the first UE 121 is registered in the IMS node 130 and configured to support the media of the outgoing media call, the network node 150 may further be configured to initiate, e.g. by means of an initiating unit 760 in the network node 150 depicted in FIG. 7b, the outgoing media call from the first UE 121.

When the first UE 121 is not registered in the IMS node 130 and/or is not configured to support the media of the outgoing media call, the network node 150 may further be configured to decide, e.g. by means of a deciding unit 770 in the network node 150 depicted in FIG. 7b, how to proceed with the outgoing media call.

The network node 150 may decide to instruct, e.g. by means of an instructing unit 780 in the network node 150 depicted in FIG. 7b, the DA device 125 to offer the user to set up the outgoing media call on a second UE 122 out of the multiple UEs 121, 122, 123.

The network node 150 may further decide to instruct, e.g. by means of the instructing unit 780 in the network node 150 depicted in FIG. 7b, the DA device 125 to request the user to select an alternative UE among the multiple UEs 121, 122, 123 to set up the outgoing media call.

The network node 150 may further decide to instruct, e.g. by means of the instructing unit 780 in the network node 150 depicted in FIG. 7b, the DA device 125 to tell the user 120 that the pick-up of the incoming media call on the first UE 121 is not possible The embodiments herein may be implemented through a respective processor or one or more processors, such as a processor 715 of a processing circuitry in the network node 150 depicted in FIG. 7a, together with a respective computer program code for performing the functions and actions of the embodiments herein. The program code mentioned above may also be provided as a computer program product, for instance in the form of a data carrier carrying computer program code for performing the embodiments herein when being loaded into the network node 150. One such carrier may be in the form of a CD ROM disc. It is however feasible with other data carriers such as a memory stick. The computer program code may furthermore be provided as pure program code on a server and downloaded to the network node 150.

The network node 150 may further comprise a memory 710 comprising one or more memory units to store data on. The memory comprises instructions executable by the processor 715. The memory 710 is arranged to be used to store e.g. identifiers, IMS identifiers, configurations and applications to perform the methods herein when being executed in the network node 150.

Those skilled in the art will also appreciate that the units in the network node 150 mentioned above may refer to a combination of analogue and digital circuits, and/or one or more processors configured with software and/or firmware, e.g. stored in the network node 150 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 790 comprises instructions, which when executed by the respective at least one processor 715, cause the at least one processor 715 of the network node 150 to perform the actions above.

In some embodiments, a carrier 795 comprises the computer program 790, wherein the carrier 795 is one of an electronic signal, an optical signal, an electromagnetic signal, a magnetic signal, an electric signal, a radio signal, a microwave signal, or a computer-readable storage medium.

Figure 8A:
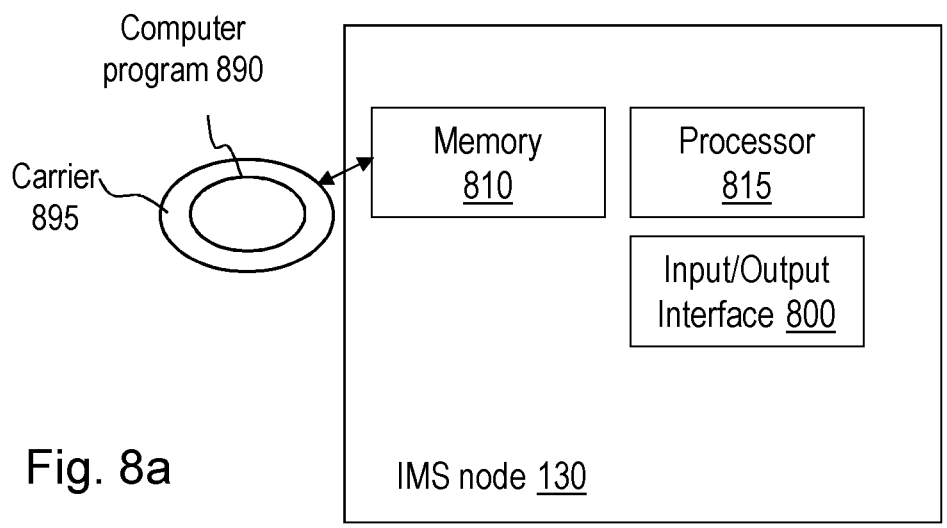
FIGS. 8 a and b are schematic block diagrams illustrating embodiments of an IMS node.
Figure 8B:
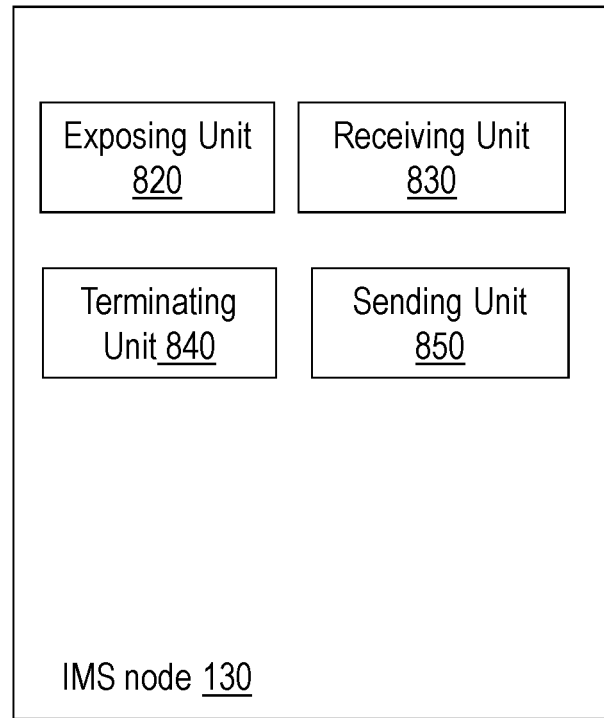

To perform the method actions above for handling an outgoing media call of a user A associated with at least one first User Equipment, UE, 121 out of multiple UEs 121, 122, 123 in a communications network 100, the IMS node 130 may comprise the arrangement depicted in FIG. 8a and FIG. 8b.

The IMS node 130 may comprise an input and output interface 800 depicted in FIG. 8a, configured to communicate e.g. with the network node 150. The input and output interface 800 may comprise a wireless receiver not shown and a wireless transmitter not shown.

The IMS node 130 may be configured to expose, e.g. by means of an exposing unit 820 in the IMS node 130 depicted in FIG. 8b, to the network node 150, an Application Program Interface, API, configured to comprise parameters associated with making a call session related to the upcoming outgoing media call and adapted to request at least IMS identifiers of the UEs 121, 122, 123.

The API parameters may be adapted to comprise any one out of intended participants in the media call adapted to be defined by corresponding User Identities, User IDs, wherein the User ID is adapted to correspond to an IMS Private Identity, IMS Private ID, and/or the respective IMS identifier adapted to define any one out of the multiple UEs 121, 122, 123.

The respective IMS identifier for any one out of the multiple UEs 121, 122, 123 may be adapted to be a Universally Unique Identifier, UUID, for the respective UE out of the multiple UEs 121, 122, 123.

The IMS node 130 is configured to receive, e.g. by means of a receiving unit 830 in the IMS node 130 depicted in FIG. 8b, from a network node 150, an IMS identifier of the first UE 121 and a request to whether or not the first UE 121 is registered in the IMS node and is configured to support media of the outgoing media call.

When the first UE 121 is registered in the IMS node and is configured to support the media of the outgoing media call, the IMS node 130 is further configured to terminate, e.g. by means of a terminating unit 840 in the IMS node 130 depicted in FIG. 8b, the outgoing media call from the first UE 121.

When the first UE 121 is not registered in the IMS node and/or is not configured to support the media of the outgoing media call, the IMS node 130 is further configured to send, e.g. by means of a sending unit 850 in the IMS node 130 depicted in FIG. 8b, a response to the network node 150, which response is configured to comprise a message that the media call cannot be terminated from the first UE 121.

The IMS node 130 may be further configured to receive from the network node 150, e.g. by means of the receiving unit 830 in the IMS node 130 depicted in FIG. 8b, an IMS user ID configured to be associated with a first persona of the first user A, and a request to whether or not the first persona of the first user A is registered in the IMS node 130 and is configured to support the outgoing media.

The IMS node 130 may be further configured to terminate, e.g. by means of the terminating unit 840 in the IMS node 130 depicted in FIG. 8b, the outgoing media call from the first UE 121 using the first persona, when the first UE 121 is registered in the IMS node and supports the media of the outgoing media call, and when the first persona of the first user A is registered in the IMS node and supports the outgoing media call.

When the first UE 121 is not registered in the IMS node and/or does not support the media of the outgoing media call and/or when the first persona of the first user A is not registered in the IMS node and/or does not support the outgoing media call, the IMS node 130 may be further configured to send, e.g. by means of the sending unit 850 in the IMS node 130 depicted in FIG. 8b, a response to the network node 150, which response is adapted to comprise a message that the media call cannot be terminated from the first UE 121 using the first persona.

The embodiments herein may be implemented through a respective processor or one or more processors, such as a processor 815 of a processing circuitry in the IMS node 130 depicted in FIG. 8a, together with a respective computer program code for performing the functions and actions of the embodiments herein. The program code mentioned above may also be provided as a computer program product, for instance in the form of a data carrier carrying computer program code for performing the embodiments herein when being loaded into the IMS node 130. One such carrier may be in the form of a CD ROM disc. It is however feasible with other data carriers such as a memory stick. The computer program code may furthermore be provided as pure program code on a server and downloaded to the IMS node 130.

The IMS node 130 may further comprise a memory 810 comprising one or more memory units to store data on. The memory comprises instructions executable by the processor 815. The memory 810 is arranged to be used to store e.g. identifiers, IMS identifiers, configurations and applications to perform the methods herein when being executed in the IMS node 130.

Those skilled in the art will also appreciate that the units in the IMS node 130 mentioned above may refer to a combination of analogue and digital circuits, and/or one or more processors configured with software and/or firmware, e.g. stored in the IMS node 130 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 890 comprises instructions, which when executed by the respective at least one processor 815, cause the at least one processor 815 of the IMS node 130 to perform the actions above.

In some embodiments, a carrier 895 comprises the computer program 890, wherein the carrier 895 is one of an electronic signal, an optical signal, an electromagnetic signal, a magnetic signal, an electric signal, a radio signal, a microwave signal, or a computer-readable storage medium.

Further Extensions and Variations

Figure 9:
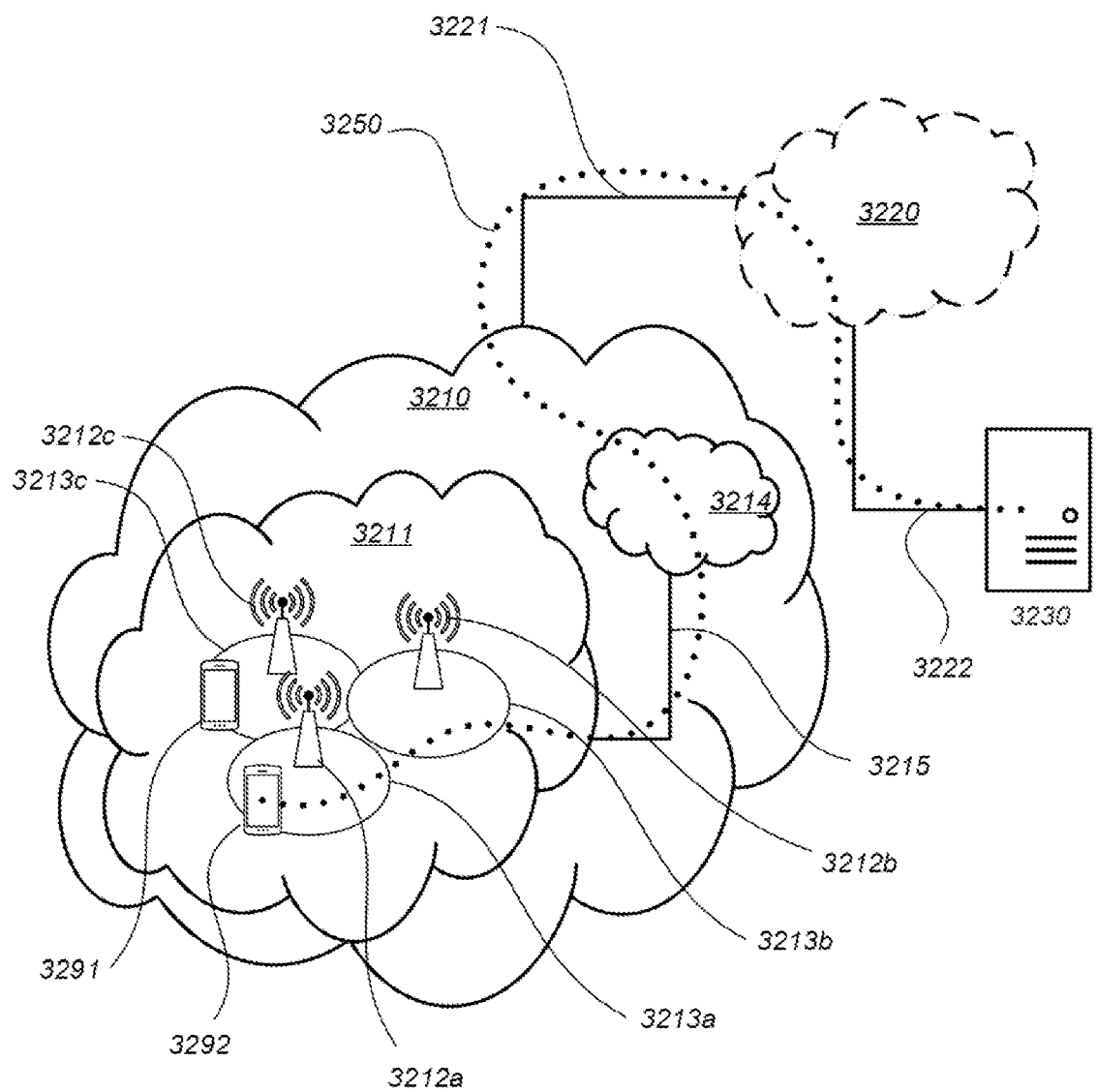
FIG. 9 schematically illustrates a telecommunications network connected via an intermediate network to a host computer.

With reference to FIG. 9, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the radio network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless devices 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a.

While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
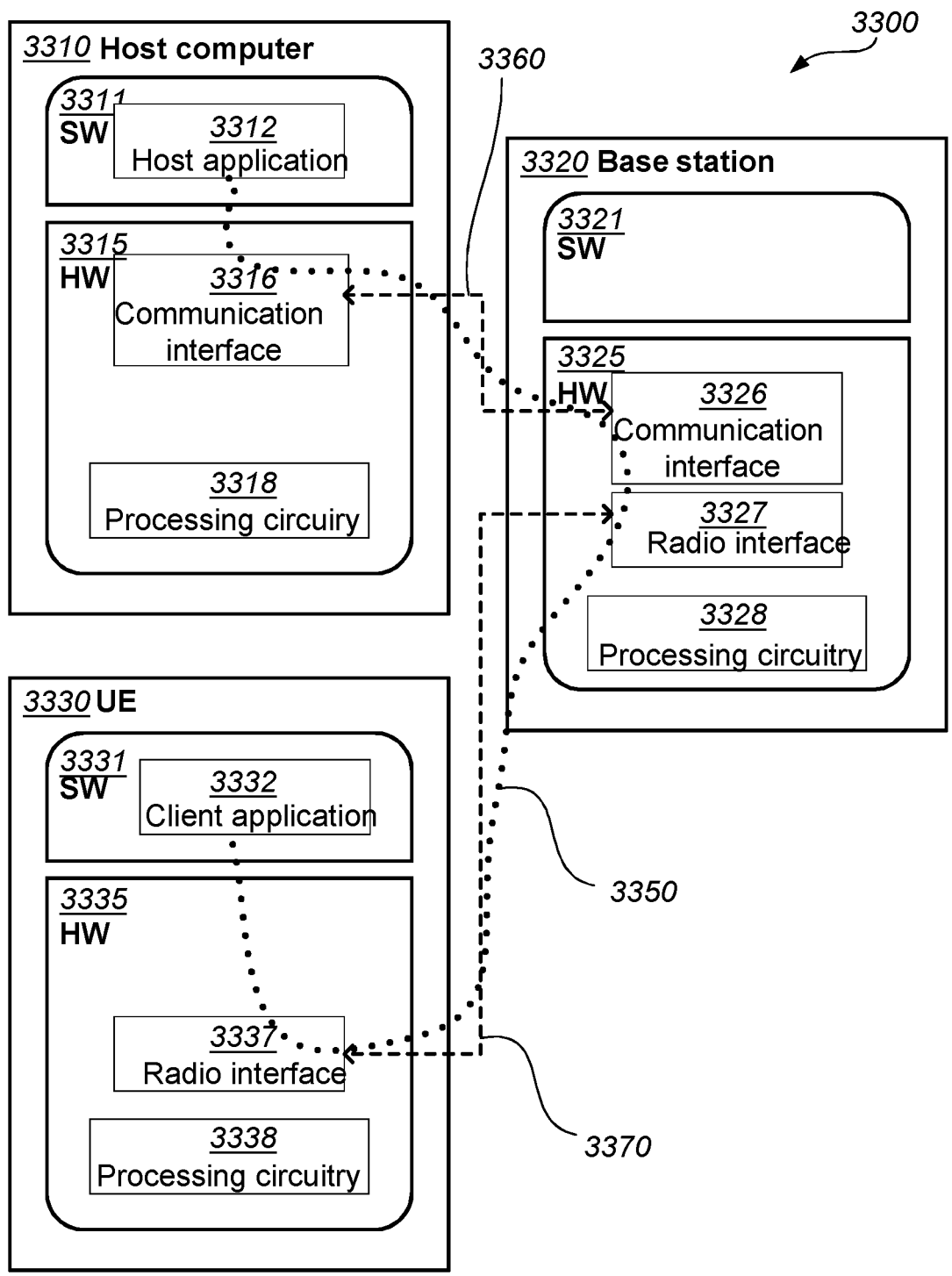
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
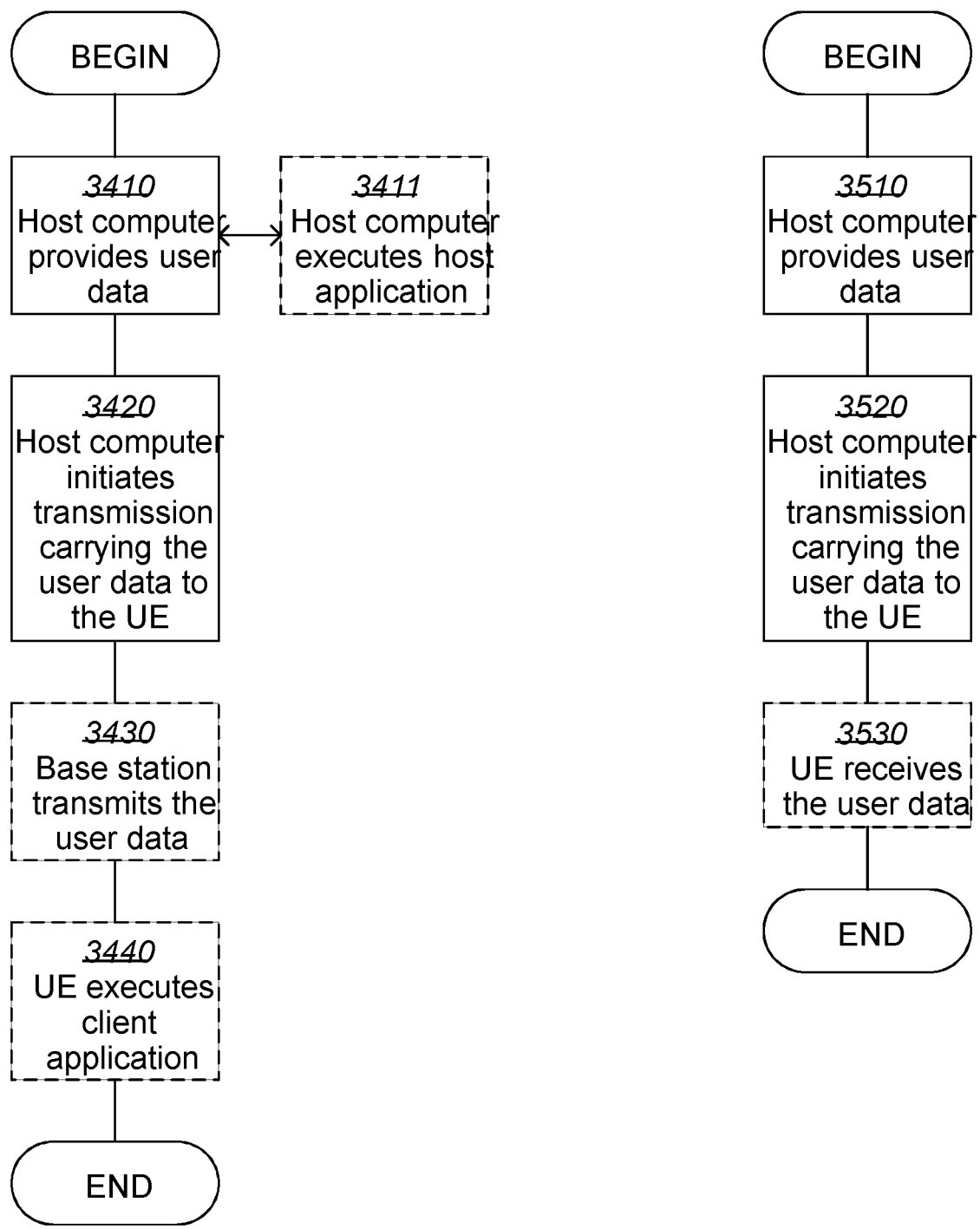

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node, for handling an outgoing media call of a user associated with multiple User Equipments, UEs, in a communications network, the method comprising:

receiving a request for the outgoing media call to be set up from a first UE out of the multiple UEs, which request is obtained as a voice instruction from the user via a Digital Assistant, DA, device, which voice instruction comprises a personalized name associated with the first UE, identifying among the multiple UEs, the first UE and its associated IP Multimedia Subsystem, IMS, identifier based on the personalized name received in the voice instruction, sending to an IMS node, the identified IMS identifier of the first UE and a request to whether or not the first UE is registered in the IMS node and supports media of the outgoing media call, when the first UE is registered in the IMS node and supports the media of the outgoing media call, initiating the outgoing media call from the first UE, and when the first UE is not registered in the IMS node and/or does not support the media of the outgoing media call, deciding how to proceed with the outgoing media call.

2. The method according to claim 1, wherein the request for the outgoing media call to be set up from a first UE out of the multiple UEs further comprises an indication of a media format of the media in the outgoing media call, which media format is specified by the user in the voice instruction.

3. The method according to claim 1, wherein deciding how to proceed with the outgoing media call comprises instructing the DA device to offer the user to set up the outgoing media call on a second UE out of the multiple UEs.

4. The method according to claim 1, wherein deciding how to proceed with the outgoing media call comprises instructing the DA device to request the user to select an alternative UE among the multiple UEs to set up the outgoing media call.

5. The method according to claim 1, wherein deciding how to proceed with the incoming media call comprises instructing the DA device to tell the user that the pick-up of the incoming media call on the first UE is not possible.

6. The method according to claim 1, wherein the network node is represented by an application server node.

7. The method according to claim 1, wherein the request obtained as a voice instruction from the user further comprises a request for the outgoing call to be set up via a first persona out of multiple personas associated with the user, wherein the voice instruction further comprises a personalized name associated with the first persona of the user.

8. The method according to claim 7, wherein:
identifying among the multiple UEs, the first UE and its associated IMS identifier based on the personalized name received in the voice instruction, further comprises identifying among the multiple personas associated with the user, an IMS user ID based on the personalized name associated with the first persona of the user received in the voice instruction, and wherein sending to the IMS node, the identified IMS identifier of the first UE and a request to whether or not the first UE is registered in the IMS node and supports media of the outgoing media call, further comprises sending the identified IMS user ID to the IMS node.

9. A computer program product comprising a non-transitory computer readable medium storing instructions, which when executed by a processor, causes the processor to perform actions according to claim 1.

10. A network node configured to handle an outgoing media call of a user associated with multiple User Equipments, UEs, in a communications network, the network node being further configured to:
receive a request for the outgoing media call to be set up from a first UE out of the multiple UEs, which request is adapted to be obtained as a voice instruction from the user via a Digital Assistant, DA, device, which voice instruction is adapted to comprise a personalized name associated with the first UE,
identify among the multiple UEs, the first UE and its associated IP Multimedia Subsystem, IMS, identifier based on the personalized name adapted to be received in the voice instruction,
send to an IMS node, the identified IMS identifier of the first UE and a request to whether or not the first UE is registered in the IMS node and is configured to support media of the outgoing media call,
when the first UE is registered in the IMS node and configured to support the media of the outgoing media call, initiate the outgoing media call from the first UE, and
when the first UE is not registered in the IMS node and/or is not configured to support the media of the outgoing media call, decide how to proceed with the outgoing media call.

11. The network node according to claim 10, wherein the request for the outgoing media call to be set up from the first UE out of the multiple UEs is configured to comprise an indication of a media format of the media in the outgoing media call, which media format is adapted to be specified by the user in the voice instruction.

12. The network node according to claim 10, further being configured to decide how to proceed with the outgoing media call by instructing the DA device to offer the user to set up the outgoing media call on a second UE out of the multiple UEs.

13. The network node according to claim 10, further being configured to decide how to proceed with the outgoing media call by instructing the DA device to request the user to select an alternative UE among the multiple UEs to set up the outgoing media call.

14. The network node according to claim 10, further being configured to decide how to proceed with the outgoing media call by instructing the DA device to tell the user that the pick-up of the incoming media call on the first UE is not possible.

15. The network node according to claim 10, wherein the network node is adapted to be represented by an application server node.

16. The network node according to claim 10, wherein the request to the IMS node is adapted to comprise a request for the outgoing call to be set up via a first persona out of multiple personas associated with the user, and wherein the voice instruction is further adapted to comprise a personalized name associated with the first persona of the user.

17. The network node according to claim 16, further being configured to:
identify, among the multiple personas associated with the user, an IMS user ID based on the personalized name associated with the first persona of the user adapted to be received in the voice instruction, and
send the identified IMS user ID to the IMS node.

* * * * *